April 22, 1969  W. A. BERGLUND  3,439,704
SAFETY VALVE ASSEMBLY FOR BRAKE LINES
Filed Feb. 7, 1966
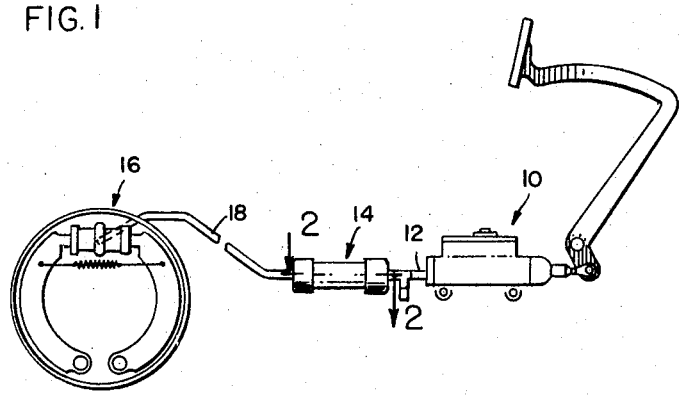
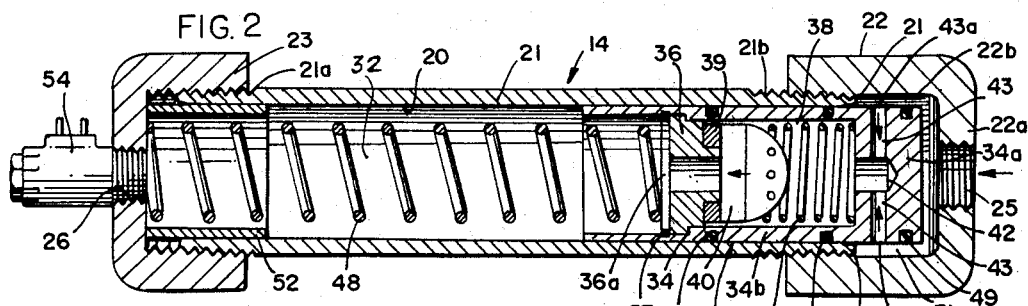
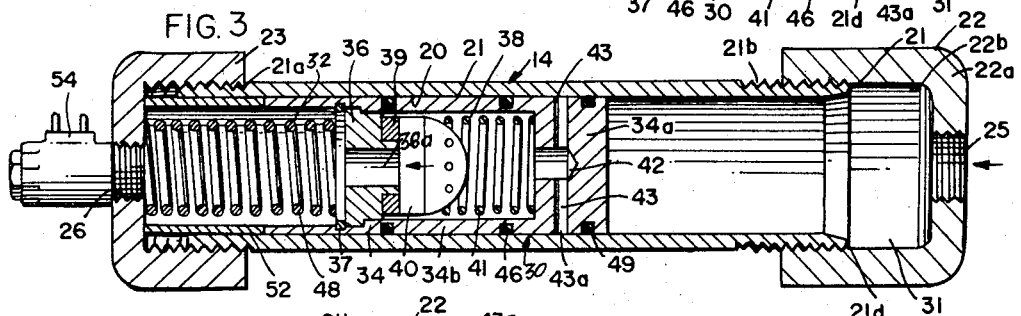
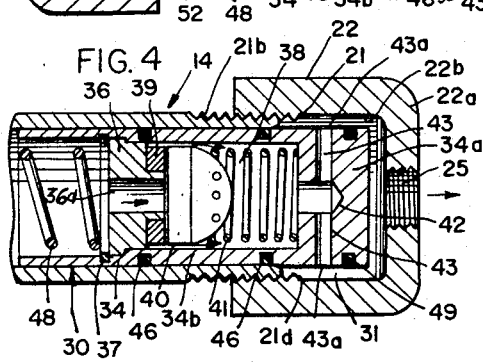
INVENTOR:
WILHELM A. BERGLUND
BY
ATT'YS United States Patent Office

3,439,704
Patented Apr. 22, 1969

3,439,704
SAFETY VALVE ASSEMBLY FOR BRAKE LINES
Wilhelm A. Berglund, 6834 W. Ardmore Ave.,
Chicago, Ill. 60631
Filed Feb. 7, 1966, Ser. No. 525,631
Int. Cl. F16k 17/00
U.S. Cl. 137—498                                    8 Claims

ABSTRACT OF THE DISCLOSURE

A novel safety valve assembly is provided for use in the hydraulic brake lines of automobiles for automatically isolating brake wheel cylinder assemblies from the hydraulic cylinder whenever disabling leaks occur in the assemblies or in the flexible lines leading thereto. The safety valve includes a piston movable in a cylinder upon a rapid loss of fluid such as would be encountered in a brake failure and which when moved is effective to lock into place preventing escape of fluid therethrough.

---

This invention relates to a novel safety valve assembly for use in hydraulic brake lines for automatically isolating brake wheel cylinder assemblies from the hydraulic cylinder whenever disabling leaks occur in the assemblies or in the flexible lines leading thereto.

It has already been proposed to provide a device of the kind indicated, wherein, upon the occurrence of disabling leak in a wheel cylinder assembly, or in a line leading thereto, that section of the hydraulic brake system will be isolated from the remainder of the brake system. Consequently when applied to motor vehicles, a hydraulic leak in one portion of the brake system will not cause a complete failure of the entire braking system, but the operator of the vehicle will maintain braking control of at least a few of the wheels of the vehicle. One such safety valve assembly is described and claimed in my prior Patent No. 3,109,448 granted Nov. 5, 1963. Although such safety valve assemblies heretofore proposed function adequately for some service, nevertheless there have been certain difficulties encountered therewith which have prevented many of them from attaining wide commercial acceptance. One of the problems heretofore encountered is that the safety valve assembly was not sufficiently sensitive to respond to a slow leak in the hydraulic system. Another difficulty has been that a sudden surge of hydraulic fluid might activate the device into a locked position and thereby disable a portion of the braking system unnecessarily.

Accordingly it is an object of the present invention to provide a new and improved safety valve assembly which overcomes the above mentioned difficulties.

Yet another object of the present invention is to provide a new and improved safety valve assembly.

A further object of the present invention is to provide a new and improved safety valve assembly which is adequately sensitive to afford protection to certain types of slow leaks.

Yet another object of the present invention is the provision of a new and improved safety valve assembly which will not actuate unnecessarily to disable a portion of the braking system.

In accordance with these and other objects, there is provided an improved safety valve assembly for use in the hydraulic system of a motor vehicle and the like which is effective to isolate a portion of the brake system upon the rupture of a brake line or other hydraulic failure causing loss of hydraulic fluid in that portion of the braking system. The present device differs from the prior Patent No. 3,109,448 in principle of action. The prior device depended upon pressure for control whereas the improved device depends on the control of the fluid volume which permits the pressures within the system to adjust themselves without the need for mechanical components or devices. The new device is simpler to make and the tolerances of moving parts are not critical so troubles due to corrosion and gumming are decreased. To this end there is provided a valve piston assembly within a valve cylinder which divides the cylinder into an inlet chamber and an outlet chamber. A spring in the valve cylinder biases the valve piston assembly toward the inlet end of the cylinder. Suitable valve means are provided which interconnect the inlet and discharge chambers when the valve piston assembly is in its normal position so that fluid flow of hydraulic fluid may occur from the inlet chamber to the discharge chamber during a normal braking application. On the other hand means are provided for blocking the valve means when an abnormal pressure differential exists between the discharge chamber and the inlet chamber due to a rupture or leak of the hydraulic system and a reduction in the volume of fluid on the discharge side of the piston. In one preferred embodiment of the invention the valve means comprises a check valve located within the piston and including passageway means extending into the inlet chamber. If a rupture occurs in a brake line, the loss of fluid on the discharge side of the piston will result in a sufficient pressure differential between the discharge chamber and the inlet chamber acting upon the piston to move the piston against the return bias of the restraining spring, and the passageway means will be blocked by the side wall of the valve cylinder thereby preventing flow of hydraulic fluid past the valve piston.

For a better understanding of the invention;

FIG. 1 is a schematic elevational view illustrating a safety valve according to the present invention as installed in an hydraulic brake line of a motor vehicle;

FIG. 2 is a cross sectional view of the safety device according to the present invention, taken along line 2—2 of FIG. 1, drawn to a larger scale, and shown with the piston assembly thereof in normal position;

FIG. 3 is a cross sectional view of the safety valve assembly, similar to that shown in FIG. 2, but illustrated with the piston assembly positioned in a fluid blocking condition in response to a failure of the hydraulic system; and FIG. 4 is a fragmentary sectional view of the safety valve assembly illustrating the operation of the piston assembly during a brake releasing operation.

Referring now to the drawings, and particularly to FIG. 1 thereof, there is shown a pedal operated hydraulic brake system master cylinder 10, from which leads a relatively rigid pressure line 12, on which is connected a safety valve assembly 14 in accordance with the present invention. The safety valve assembly 14 is connected to a brake cylinder assembly 16, as by a flexible discharge line 18.

Referring to FIGS. 2, 3, and 4, the safety valve assembly 14 comprises an elongated hollow cylinder 20 including a hollow cylinder member 21 closed by an inlet end cap 22 and a discharge end cap 23. The discharge end cap 23 is threaded on external threads 21a on the discharge end of the cylinder member 21. The inlet end cap 22 is also threaded on external threads, as indicated at 21b, but has an end wall 22a spaced from the end 21c of the cylinder member 21 and is provided with an inner cylindrical surface 22b larger than the inner diameter of the cylinder member 21 and defining an enlarged annular portion as an extension of the cylinder member 21. The cylinder member 21 along with the inner cylindrical surface 22b of the inlet end cap 22 together define the cylinder 20 to provide a cylinder having an enlarged inner bore at its inlet end. The inlet cap is provided with an inlet passageway, here indicated as a threaded aperture 25, communicating with the enlarged annular portion 22b. Similarly the discharge end cap 23 is provided with a discharge passageway, here shown as a threaded aperture 26, communicating with the cylinder 20. A piston assembly 30 divides the cylinder 20 into an inlet chamber 31 and a discharge chamber 32. The piston assembly 30 includes a generally cup-shaped piston 34 slideably mounted in the cylinder 20 and having a top 34a and a depending hollow cylindrical skirt 34b extending toward the discharge end of the cylinder 20.

To provide normal flow of brake fluid through the safety valve upon a normal application of the hydraulic brake, suitable passage means for bypass means are provided. More specifically a stop or stop washer 36 is secured within the skirt 34b remote from the top 34a by a suitable C-spring or ring 37 to define a valve chamber 38 within the piston 34. The stop washer 36 is provided with a passageway 36a, here shown as a central axial opening, communicating between the valve chamber 38 and the discharge chamber 32. A washer-shaped seal 39 is secured on the inner surface of the stop washer 36. A check valve 40 in the valve chamber 38 permits and controls the volume of fluid flow from the valve chamber 38 into the discharge chamber 32. A helical spring 41 biases the check valve 40 against the seal 39. Moreover the top 34a of the piston 34 is provided with passageway means communicating between the valve chamber 38 and the inlet chamber 31. In the illustrated embodiment the passageway means comprises an axial bore 42 and a plurality of radial passageways 43 extending from the axial bore 32 and having ports 43a opening on the side surface of the portion of the piston 34 which extends into the enlarged annular portion 22b of the cylinder 20. A pair of O-rings 46 in the outer wall of the skirt 34b prevent fluid flow between the skirt 34b and the cylinder 20.

In order to bias the piston 34 toward the inlet end of the cylinder 20 with the portion thereof extending into the annular portion 22b of the cylinder 20, there is provided the check valve 40 and suitable spring, here indicated as a helical spring 48, within the cylinder member 21 and bearing against the stop washer 36.

It will be understood that when the piston 34 moves toward the discharge end of the cylinder 20 under the influence of a hydraulic brake line failure, the ports 43a will be blocked or closed off by the inner surface of the cylinder 20, as best illustrated in FIG. 3. Accordingly there is provided an additional O-ring or seal 49 outwardly of the radial passageways 43 to prevent leakage into the passageways 43 from the inlet chamber of the cylinder 20 after the piston assembly 30 has moved to the left (for example, as viewed in FIG. 2). The inner surface of the cylinder member 21 at the inlet end 21c is chamfered, as indicated at 21d to receive the O-ring 49 if the piston assembly 30 is called upon to move to the left by a failure of the hydraulic system.

A piston stop 52 in the discharge end of the cylinder 20 serves to limit the movement of the piston assembly within the cylinder.

To provide an indication that servicing is required before a serious incident can occur, there may be provided a pressure responsive warning device actuated by a pressure responsive switch 54.

From the foregoing detailed description, the operation of the safety valve assembly is believed clear. However, briefly, FIGS. 2 and 4 illustrate the safety valve assembly under its normal operating conditions. Upon an initial application of the brake, hydraulic pressure is exerted in the safety valve assembly 14. The hydraulic fluid will pass first into the enlarged annular portion 22b of the cylinder 20, then through the radial passageways 43, into the avial bore 42, and into the valve chamber 38. The hydraulic fluid will then pass through the one-way check valve 40, through the passageway 36a and into the discharge chamber 32 of the safety valve assembly 14. Due to the check valve 40 in the piston assembly 30, all the required fluid is bypassed through the piston assembly and increases on the discharge side of the safety valve assembly 14 to the amount necessary to activate the wheel cylinder 16 and at the same time exert an opposing force on the forward movement of the piston, since the fluid cannot be compressed. Therefore the pressure in the inlet chamber 31 and the discharge chamber 32 remains approximately equal and the piston assembly 30 will not move.

Upon release of the brake, fluid returning from the brake cylinder assembly 16 will be effective to unseat the check valve 40 from the seal 39 against the bias of the spring 41 to return first into the valve chamber 38, and then through the axial bore 42 and radial passageways 43 into the inlet chamber on the cylinder 20.

In the event of a failure in the hydraulic system, the volume of fluid on the discharge side decreases by a predetermined amount which will require a sufficient pressure in the inlet chamber to move the entire valve assembly forward to engage the seal 49 on the piston assembly 30 in the cylinder member 21 to block the ports 43a and prevent hydraulic fluid from bypassing around the piston 34. It will be appreciated that in order to effect movement of the piston assembly 30, the loss of volume of fluid must be sufficient to create a determined pressure differential between the inet chamber 31 and the discharge chamber 32 so that the piston moves forward with the decrease in volume of fluid. The piston assembly 30 will be moved to the left until it strikes against the piston stop 52, as indicated in FIG. 3. A permanent seal is effected, with the check valve in the master cylinder maintaining the same original pressure in the inlet chamber of the cylinder which is present when the system is static. This pressure retains the plunger's permanent seal in the cylinder bore.

Advantageously the safety valve assembly according to the present invention will effectively isolate a ruptured brake line without undue possibility of malfunctioning of the safety valve assembly. The check valve 40 contains the volume of fluid in the discharge chamber 32 to prevent the forward movement of the piston assembly even though the pressure is equal in the inlet and discharge chambers. Moreover the safety valve assembly will respond to a slow leak dependent, of course, upon the quantity of fluid lost provided that the piston assembly 30 moves to the left until the seal 49 becomes effective. Once the seal 49 enters the cylinder member 21, the discharge chamber 32 becomes an auxiliary reservoir permitting the continued operation of the brakes until the fluid is depleted. The sealing action of the safety valve assembly is dependent upon the loss of pressure in the discharge chamber 32 which restrains the forward movement of the piston assembly 30. The warning light will indicate the need for servicing before any serious incident occurs. Consequently the safety valve assembly can prevent damage to the brake lines due to an undetected slow leak in the system. Moreover there is no danger of accidental locking of the piston assembly due to sudden surges of brake fluid or the like.

Although the present invention has been described by reference to only a single embodiment thereof, it will be apparent that numerous other modifications and embodiments may be devised by those skilled in the art. And it is intended by the appended claims to cover all modifications and embodiments which fall within the true spirit and scope of the present invention.

What is claimed as new and desired to be secured by Letters Patent of the United States is:

1. A brake line safety valve assembly comprising:
   a hollow cylinder having an inlet end and a discharge end;
   means closing the ends of said cylinder;
   piston means in said cylinder dividing said cylinder into an inlet chamber and an outlet chamber;
   inlet means communicating with said inlet chamber;

discharge means communicating with said discharge chamber;

biasing means biasing said piston means toward said inlet end to a first position;

valve means including passageway means interconnecting said chambers when said piston is in said first position for permitting flow from said inlet chamber to said discharge chamber when need for additional fluid to activate brakes occurs;

means blocking said valve means when said piston means moves away from said first end in response to loss of fluid volume in discharge end; and valve means interconnecting said chambers for permitting return flow of fluid from said discharge chamber to said inlet chamber when said piston is in said first position.

2. A brake line safety valve assembly comprising:

a hollow cylinder having an inlet end and a discharge end;

means closing the ends of said cylinder;

piston means in said cylinder dividing said cylinder into an inlet chamber and an outlet chamber;

inlet means communicating with said inlet chamber;

discharge means communicating with said discharge chamber;

biasing means including a check valve and spring biasing said piston means toward said inlet end to a first position;

valve means including passageway means interconnecting said chambers when said piston is in said first position for permitting flow from said inlet chamber to said discharge chamber when need for additional fluid to activate brakes occurs; and means blocking said valve means when said piston means moves away from said first end in response to loss of fluid volume in discharge end;

said piston moving from said first position when the pressure differential between said chambers exerts a force on said piston sufficient to overcome the bias of said spring and a predetermined pressure in discharge chamber due to volume of fluid loss.

3. A brake line safety valve assembly comprising:

a hollow cylinder member having an inlet end and a discharge end;

a first end cap closing said discharge end and provided with discharge conduit means;

a second end cap closing said inlet end and having an end wall spaced from the end of said cylinder member and having an inner cylindrical surface larger than the inner diameter of said cylinder member and forming an enlarged annular portion as an extension of said cylinder member to define a cylinder with an enlarged inner bore at its inlet end and provided with inlet conduit means communicating with said enlarged annular portion;

a generally cup-shaped piston in said cylinder having a top and a hollow cylindrical skirt dividing said cylinder into an inlet chamber and a discharge chamber and positioned with said skirt toward said discharge end;

check valve and spring means in said cylinder biasing said piston toward said inlet end to a first position with a portion of said piston projecting into said annular portion;

a stop washer secured in said skirt remote from said top to define a valve chamber, said stop washer being provided with a passageway communicating between said valve chamber and said discharge chamber;

said piston being provided with passageway means communicating from said valve chamber and having port means opening on the outer side surface of said portion thereof whereby movement of said piston against the bias of said spring means is effective to block said port means by the inner surface of said cylinder member.

4. A brake line safety valve assembly as set forth in claim 3 above and including a pressure responsive switch operatively connected to said discharge chamber.

5. A brake line safety valve assembly as set forth in claim 3 above and including a washer-shaped seal interposed between said stop washer and said check valve.

6. A brake line safety valve assembly as set forth in claim 3 above wherein said passageway means includes a plurality of radial passages in said portion of said piston.

7. A brake line safety valve assembly as set forth in claim 3 above wherein sealing ring means are carried on said portion outwardly of said port means.

8. A brake line safety valve assembly as set forth in claim 7 above wherein the inner surface of the cylinder member at its inlet end is chamfered to guide said sealing ring means when said piston moves away from said first position.

References Cited

UNITED STATES PATENTS 2,411,392  11/1946  Saville _____ 137—498

M. CARY NELSON, *Primary Examiner.*

ROBERT J. MILLER, *Assistant Examiner.*

U.S. Cl. X.R.

137—512.2